(12) United States Patent
Sathe

(10) Patent No.: US 7,966,324 B2
(45) Date of Patent: Jun. 21, 2011

(54) PERSONALIZING A SEARCH RESULTS PAGE BASED ON SEARCH HISTORY

(75) Inventor: Saleel Sathe, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 11/442,551

(22) Filed: May 30, 2006

(65) Prior Publication Data

US 2007/0294615 A1  Dec. 20, 2007

(51) Int. Cl.
*G06F 17/30* (2006.01)
(52) U.S. Cl. ........................................ 707/732; 707/768
(58) Field of Classification Search .................. 707/727, 707/732, 768
See application file for complete search history.

(56) References Cited

U.S. PATENT DOCUMENTS

| | | | |
|---|---|---|---|
| 6,006,225 A * | 12/1999 | Bowman et al. ................... | 707/5 |
| 6,195,679 B1 | 2/2001 | Bauersfeld | |
| 6,260,192 B1 | 7/2001 | Rosin | |
| 6,272,507 B1 | 8/2001 | Pirolli | |
| 6,397,212 B1 | 5/2002 | Biffar | |
| 6,718,324 B2 * | 4/2004 | Edlund et al. ..................... | 707/5 |
| 6,782,370 B1 * | 8/2004 | Stack ............................. | 705/10 |
| 7,418,403 B2 * | 8/2008 | Reid et al. ....................... | 705/26 |
| 7,472,119 B2 * | 12/2008 | Dai et al. ............................. | 1/1 |
| 2002/0143759 A1 | 10/2002 | Yu | |
| 2002/0174230 A1 | 11/2002 | Gudorf | |
| 2003/0051157 A1 | 3/2003 | Nguyen | |
| 2004/0153428 A1 * | 8/2004 | Reid et al. ....................... | 706/50 |
| 2005/0022240 A1 | 1/2005 | Ueda | |
| 2005/0033657 A1 * | 2/2005 | Herrington et al. ............. | 705/26 |
| 2005/0044139 A1 | 2/2005 | Christian | |
| 2005/0071328 A1 | 3/2005 | Lawrence | |
| 2005/0076003 A1 * | 4/2005 | DuBose et al. .................... | 707/1 |
| 2005/0102202 A1 | 5/2005 | Linden | |
| 2005/0120003 A1 | 6/2005 | Drury | |
| 2005/0177538 A1 | 8/2005 | Shimizu | |
| 2005/0240580 A1 | 10/2005 | Zamir | |
| 2005/0278317 A1 * | 12/2005 | Gross et al. ....................... | 707/3 |
| 2006/0059147 A1 * | 3/2006 | Weiss et al. ....................... | 707/6 |

OTHER PUBLICATIONS

Query-Log Based Authority Analysis for Web Information Search http://scholar.google.com/scholar?hl=en&lr=&q=cache:AO2LO__UUim0J:delis.upb.de/paper/DELIS-TR-137.pdf+.
Learning a Model of a Web User's Interests http://users.cs.dal.ca/~eem/malnis/Readings/hongyu/GreinerUM2003LearningUserModel.pdf.
SearchPad: Explicit Capture of Search Context to Support Web Search http://www9.org/w9cdrom/173/173.html.
Personalized Spiders for Web Search and Analysis http://delivery.acm.org/10.1145/380000/379454/p79-chau.pdf?key1=379454&key2=8011401411&coll=GUIDE&dl=GUIDE&CFID=69897021&CFTOKEN=2942572.
Optimizing Search Engines using Click through Data http://delivery.acm.org/10.1145/780000/775067/p133-joachims.pdf?key1=775067&key2=4621401411&coll=GUIDE&dl=GUIDE&CFID=69897288&CFTOKEN=41474179.

* cited by examiner

*Primary Examiner* — Charles Rones
*Assistant Examiner* — Mellissa M Chojnacki
(74) *Attorney, Agent, or Firm* — Shook Hardy & Bacon, LLP

(57) ABSTRACT

A system and method for personalizing a search results mix based on a user's search history. A system monitors the types of search results that the user frequently accesses. A default search results page can then be modified according to the frequency in which the user accesses certain search results. The modified search results page can then be presented to the user upon the submission of a search request.

14 Claims, 3 Drawing Sheets

PERSONALIZING A SEARCH RESULTS PAGE BASED ON SEARCH HISTORY

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Real estate on a search results page can be valuable and can be filled with a variety of information including algorithmic web results, advertisements, and other useful information. Advertisements, in particular, are sometimes presented on a search results page when the advertisement relates to the corresponding search query submitted by a user. Conventionally, displaying advertisements to users is done on a global scale. Therefore, the same search query submitted by two different users would produce the same related advertisements. However, every user does not have the same interests. One user may find the advertisements useful while another user may find the same advertisements to be annoying or useless.

Some users may enjoy having advertisements placed on a search results page as the advertisements are helpful for their needs. In such a case, it may be beneficial to be able to present more advertisements to those users. However, the same advertisements may be bothersome to other users. In such a case, it may be beneficial to present less advertisements to those users. Therefore, it may be beneficial to have a method that will personalize search results pages according to an individual user's needs or interests.

SUMMARY

A system and method for personalizing a search results mix based on a user's search history are disclosed. In an embodiment, the method can be configured to monitor a user's activity for accessing various types of search results. The method can determine a user access frequency for a non-algorithmic search result on a search results page. The user access frequency can be monitored until it reaches a threshold frequency value. Once the threshold value has been reached, a default search results page layout can be modified according to the user's use of the type of non-algorithmic search result. Once modified, the search results page can be presented to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
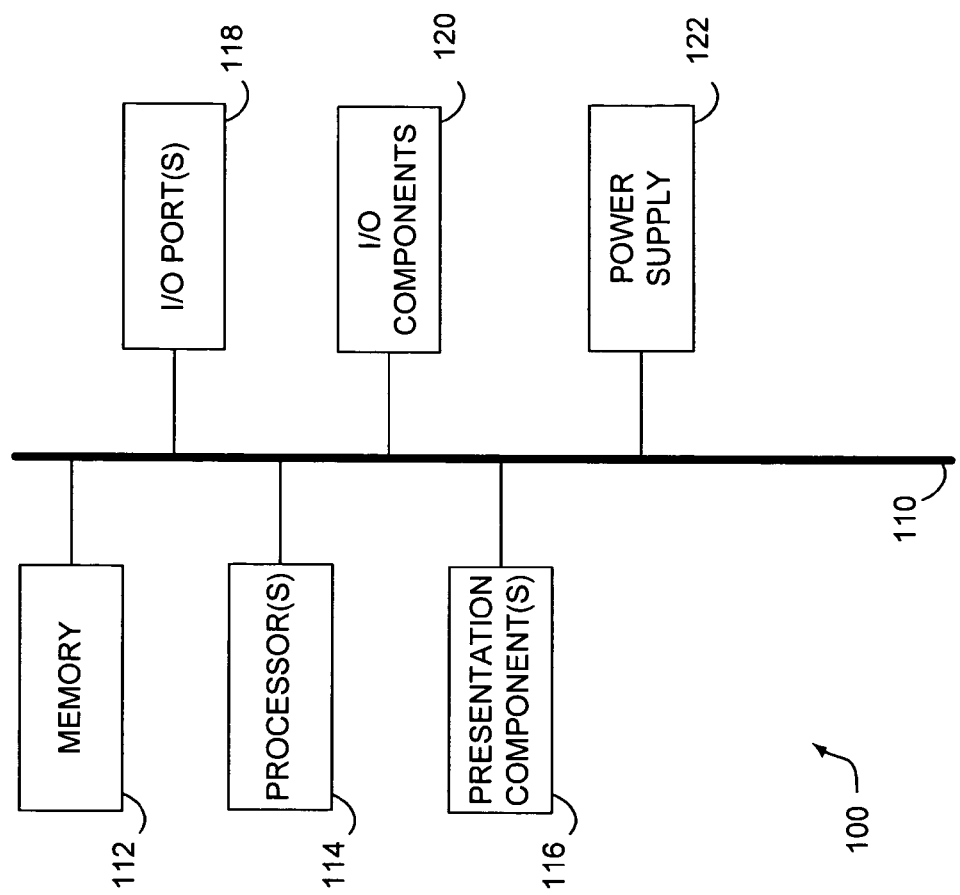
FIG. 1 illustrates an exemplary operating environment for implementing the invention.

The invention introduces a system and method for personalizing a search results mix based on a user's search history. The invention can be configured to present personalized search result pages that reflect an individual user's needs or interests. The search history of a user can be examined to determine if a user frequently accesses certain types of search results within a search results page. The search results page can be personalized for a specific user by displaying more types of search results that the user frequently accesses and less of the types of search results that the users does not access as often.

Accessing a search result can comprise utilizing any type of input device to obtain information from a search result. In an embodiment, accessing a search result comprises a user moving his/her mouse cursor over the search result or hyperlink of the search result and clicking the result or hyperlink. In another embodiment, accessing a search result can also include hovering the mouse cursor over the search result or over a hyperlink of the search result. In another embodiment, accessing a search result can include depressing any number of buttons on a keyboard, keypad, mouse, or any other input device to obtain information from the search result.

There are many different search results that can be displayed on a search results page. The different types of search results are broken down into two different categories: algorithmic search results and non-algorithmic search results. An algorithmic search result is a web result that is based on a search engine's index algorithm. Typically, there are ten algorithmic search results on a search results page whenever there are ten or more algorithmic search results that are found directly within the search engine's index. The algorithmic search results will usually have hyperlinks that will link a user to the web page of the corresponding algorithmic search result.

A non-algorithmic search result is any other information presented to the user other than the algorithmic search results that is related to the search query submitted by the user. The non-algorithmic search results are not directly derived from the search engine's index. Such non-algorithmic search results can include, but are not limited to, advertisements, sponsored links, query refinement modules, and instant answers. An instant answer is any type of search result that comes directly from a third-party source instead from a search engine's index. Such third-party sources can be, for example, Encarta, MSN Shopping, or any other source besides a search engine that is configured to provide information related to a user's search query. For example, if a user enters the search query "nation's capital," the instant answer "Nation's Capital: Washington, D.C." may be presented to the user. The instant answer may have come directly from the Encarta database. The instant answers may be convenient as a user can instantly receive an answer without having to go through any of the algorithmic search results. An instant answer may or may not have a corresponding hyperlink presented along with it.

Referring initially to FIG. 1 in particular, an exemplary operating environment for implementing the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
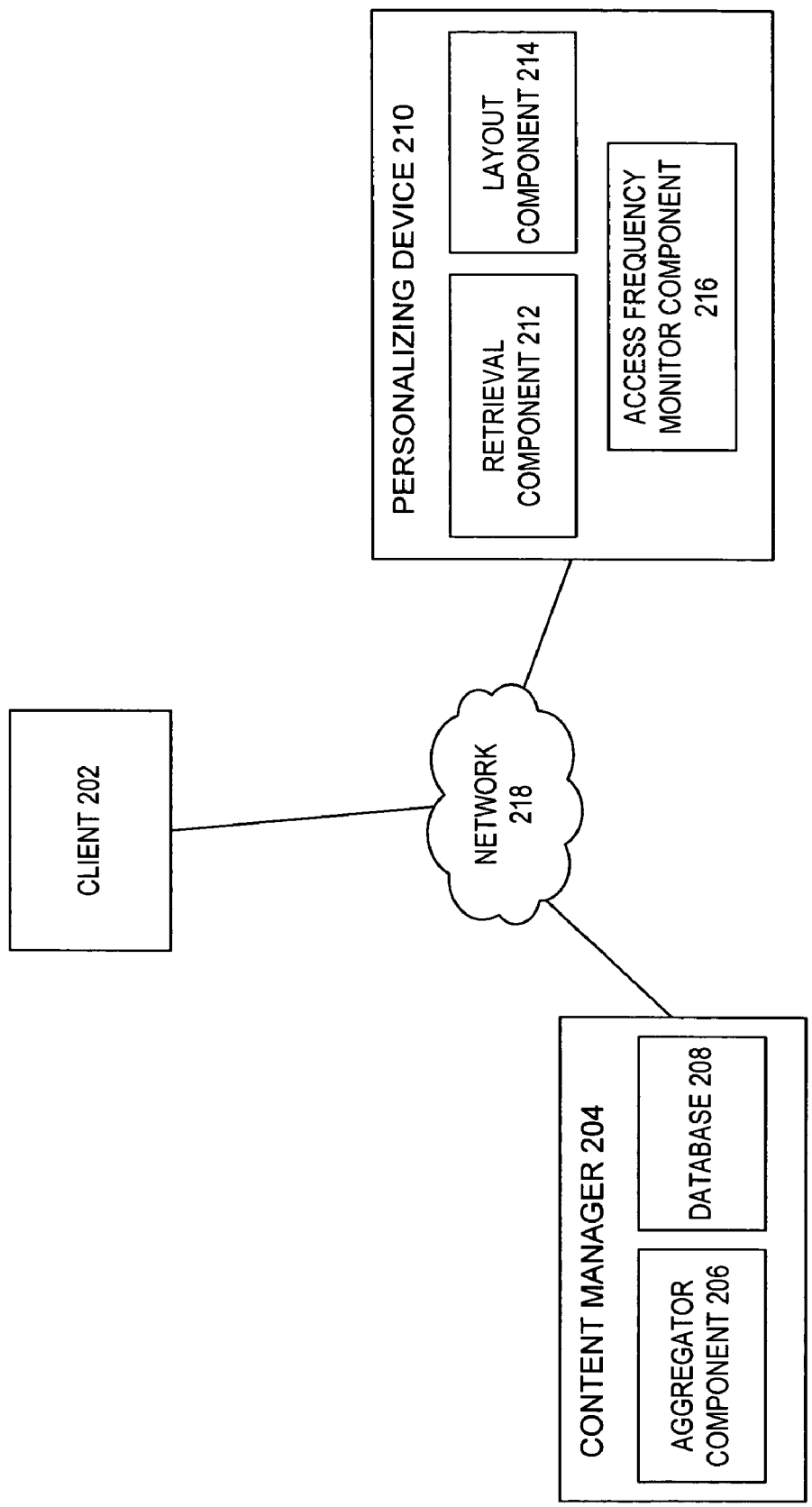
FIG. 2 illustrates an embodiment of a system for implementing the invention.

FIG. 2 illustrates an embodiment of a system for implementing the invention. Client 202, content manager 204 and personalizing device 210 are computing devices 100 that can include one or more devices illustrated in FIG. 1. Client 202 may be or include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 202 may additionally be any portable media device such as digital still camera devices, digital video cameras (with or without still image capture functionality), media players such as personal music players and personal video players, and any other portable media device. Client 202 may also be a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Client 202 can be controlled by any user.

Client 202 can include a communication interface. The communication interface may be an interface that can allow the client to be directly connected to any other client or device or allows the client 202 to be connected to a client or device over network 218. Network 218 can include, for example, a local area network (LAN), a wide area network (WAN), or the Internet. In an embodiment, the client 202 can be connected to another client or device via a wireless interface.

Content manager 204 and personalizing device 210 may each be a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Content manager can include aggregator component 206 and user information database 208. Aggregator component 206 is used to aggregate each individual user's search history information. In an embodiment, the aggregator component can be configured to monitor and collect a user's search history information that can include any information related to the way in which a user has searched for data on the Internet. Such information can include, but not limited to, search terms/keywords, times when searches queries have been submitted, web results from a search results page that were accessed, time spent on a search results page, advertisements accessed on a search results page, instant answers accessed on a search results page, and any other information derived from a user's searching experience. Once the aggregator component retrieves the user search information, the information is associated with its corresponding user and is stored in database 208. In an embodiment, the user's search information can be stored on a user's client device using a cookie. In such an embodiment, the aggregator component can aggregate the user search information from each user's client device. In an embodiment, content manager 204 is a search engine.

Personalizing device 210 is used to personalize a search results page for an individual user. In an embodiment, personalizing device 210 and content manager 204 can be integrated into one device. In an embodiment, personalizing device 210 is a search engine. Personalizing device 210 can include retrieval component 212, layout component 214, and access frequency monitor component 216. Retrieval component 212 is used to retrieve user search information from database 208. In an embodiment, the retrieval component 212 can retrieve the user search information from a user's client device.

Access frequency monitor component 216 is used to monitor how often a user accesses algorithmic and non-algorithmic search results from a search results page. The access frequency monitor component 216 can be configured to determine a user access frequency for each type of algorithmic and non-algorithmic search result presented to a user. The user access frequency corresponds to the frequency in which a user accesses an algorithmic or non-algorithmic search result in a given time period. For example, an user access frequency for an algorithmic or non-algorithmic search result can be the percentage of an algorithmic or non-algorithmic search result that a user accessed from the total number of the specific type of algorithmic or non-algorithmic search result presented to the user within a period of time. Thus, search results from a search engine, advertisements, and instants answers, for example, can each have a separate user access frequency. In another embodiment, the user access frequency is the total number of a specific type of algorithmic or non-algorithmic search result accessed by a user within a given time period. The access frequency monitor component 216 can compare the determined user access frequency to a threshold frequency value. The access frequency monitor component 216 can be configured to create an alert when the determined user access frequency reaches the threshold frequency value.

In an embodiment, the access frequency monitor component 216 can monitor how often a user accesses algorithmic and non-algorithmic search results based on a query category. A query category refers to the type of search query submitted. For example, two query categories can be commercial and non-commercial search queries. The access frequency monitor component 216 can be configured to determine a user access frequency for a corresponding query category for each type of algorithmic and non-algorithmic search result presented to a user. The access frequency monitor component 216 can compare the determined user access frequency to a threshold frequency value. For example, a user may tend to access advertisements frequently when submitting commercial search queries, however, the same user may tend to access advertisements less frequently when submitting non-commercial search queries. The access frequency monitor component can determine a user access frequency for each of the two types of query categories so that a search results page can be personalized that correlates with the user's access history. The access frequency monitor component can then, for example, display more advertisements for commercial search queries and less advertisements for non-commercial search queries when the respective threshold frequencies have been reached. However, commercial and non-commercial search queries are only two examples of query categories, as such, the invention should not be limited to only these two examples. The access frequency monitor component 216 can be configured to create an alert when the determined user access frequency reaches the threshold frequency value.

In another embodiment, the user access frequency is based on a satisfaction score. The satisfaction score can be used to show a degree of satisfaction that the user had with a particular type of search result. The access frequency monitor component 216 can be configured to monitor how the user interacts with the different types of results on a search page. The monitor component can be configured to track the time a user spends on a search results page, monitor the results accessed by the user, track the time the user spent on the web pages of the accessed search result, and evaluate a multitude of other factors that can be used to determine if a user was satisfied or dissatisfied with the search results. The access frequency component can use an algorithm to evaluate the multitude of factors to generate a corresponding satisfaction score. The satisfaction score will be used to show how confident the access frequency monitor component is that the user was satisfied with the particular type of search result. For example, a satisfaction score of 70 may be generated that means that the access frequency monitor component is 70% confident that the user was satisfied with the particular search result. The satisfaction score can be useful for determining whether a user was satisfied with an instant answer as some instant answers may not have a corresponding hyperlink for a user to click. Once determined, the satisfaction score can then be compared to a threshold satisfaction value. The access frequency monitor component can also be configured to create an alert when the determined satisfaction score reaches the threshold satisfaction value.

Layout component 214 is configured to determine the layout of a search results page. The layout component 214 is configured to specify a default layout for a search results page that includes any number of algorithmic and non-algorithmic search results. In an embodiment, layout component 214 can modify the default search results page by displaying more or less of a type of non-algorithmic search result based on any determinations made by the access frequency monitor component 216. For example, if the access frequency monitor component 216 determines that a user accesses advertisements at a high frequency that reaches a certain threshold, the monitor component can create an alert to inform the layout component 214 to display more advertisements on the search results page. Conversely, if the access frequency monitor component 216 determines that a user accesses advertisements at a low frequency that reaches a certain threshold, the monitor component can create an alert to inform the layout component to display less advertisements on the search results page. In another embodiment, the layout component 214 can modify the default search results page by rearranging the location of the algorithmic search results and any non-algorithmic search results. The rearrangement of the types of search results, in an embodiment, is based on any determinations made by the access frequency monitor component 216. For example, if the access frequency monitor component 216 determines that a user accesses advertisements at a high frequency that reaches a certain threshold, the monitor component can create an alert to inform the layout component 214 to display instant answers above the algorithmic search results. Again, such determinations and layouts are made for each individual user, therefore, each user will have their own personalized search results page depending on the type of search result he/she frequently accesses.

Figure 3:
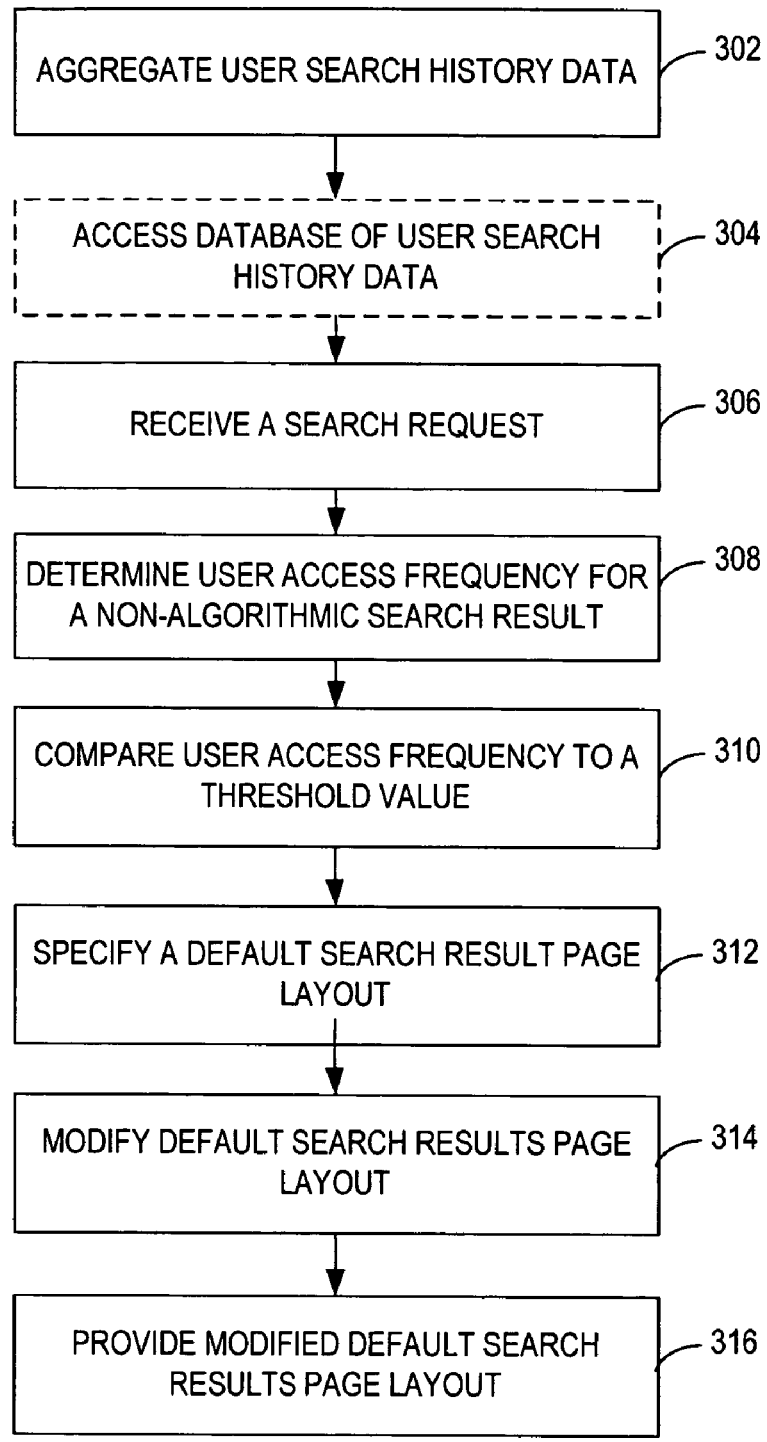
FIG. 3 illustrates an embodiment of a method for personalizing a search results mix based on a user's search history.

FIG. 3 illustrates an embodiment of a block diagram representing a method for personalizing a search results mix based on a user's search history. At operation 302, user search history data is aggregated from a plurality of users' client devices. The user search history data is then associated with its corresponding user and is stored. Alternatively, at operation 304, the user information is retrieved from a database that contains the user search data. At operation 306, a search request, including a search query, is received. At operation 308, a user access frequency is determined for a non-algorithmic search result. In determining the user access frequency, the user's search history data that describes how often the user has accessed the particular non-algorithmic search result is evaluated. In an embodiment, data older than a set time period can be disregarded from the evaluation. For example, search history data that is older than one month will be ignored in order to accurately reflect the user's current interest.

At operation 310, the determined user access frequency is compared to a threshold frequency value. There can be more than one threshold frequency that could each represent a different level of activity by the user for accessing the particular non-algorithmic search result. At operation 312, a default search result page layout is specified. The default search result page layout can be specified, for example, by an administrator, developer, or any other user. At operation 314, the default search results page is modified when the determined user access frequency reaches the threshold frequency value. In an embodiment, the default search results page is modified by increasing or decreasing the quantity of the type of non-algorithmic search result. In another embodiment, the default search results page is modified by rearranging the placement of the type of non-algorithmic search result on the search results page. At operation 316, the modified search results page is provided.

In another embodiment, the threshold frequency values can vary for different geographical locations. For example, the threshold frequency values for instant answers or advertisements can vary depending on the city, state, time zone, American region, country, or continent that a user is located. This may be due because a particular geographical location may not have the same click rate as another. For example, the same click rate in the U.S. may not apply for France, Germany, or Japan. Therefore, it may be advantageous to adjust the threshold frequency values based on geographical location.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. One or more computer-storage media having computer-useable instructions stored thereon for performing a method for personalizing a displayed arrangement of search results based on a user's search history, comprising:
   aggregating information corresponding to the user's search history;
   deriving an algorithmic search result from a search engine's index;
   retrieving a non-algorithmic search result not derived from the search engine's index, the non-algorithmic search result being one of a first non-algorithmic search result type or a second non-algorithmic search result type;
   upon identifying the non-algorithmic search result as the first non-algorithmic search result type:
   determining a first user access frequency for the first type of non-algorithmic search result based on said information, wherein search results of the first type of non-algorithmic search result include search results that provide information not derived from the search engine's index, and wherein determining the first user access frequency includes counting a total number of times that the user accessed search results of the first type of non-algorithmic search result within a predetermined period of time, and
   comparing the first user access frequency to a first threshold value;
   upon identifying the non-algorithmic search result as the second non-algorithmic search result type:
   determining a second user access frequency for the second type of non-algorithmic search result based on a user satisfaction score that shows a degree of satisfaction that the user had with the second type of non-algorithmic search result, wherein the user satisfaction score is determined using said information, and wherein search results of the second type of non-algorithmic search result include search results that provide information not derived from the search engine's index, and
   comparing the second user access frequency to a second threshold value;
   determining that the first user access frequency is at least as high as the first threshold value or that the second user access frequency is at least as high as the second threshold value;
   specifying a default layout for a search results page, the default layout indicating a location of the non-algorithmic search result and a location of the algorithmic search result on the search results page;
   automatically creating a modified search results page layout in response to determining that the first or second user access frequency is at least as high as the corresponding threshold value, wherein creating the modified search results page layout is performed by a layout component and includes rearranging the location of the non-algorithmic search result and the location of the algorithmic search result on the search results page while retaining the algorithmic search result and the non-algorithmic search result on the search results page; and
   providing the search results page having the modified search results page layout to the user.

2. The media according to claim 1, wherein the predetermined period of time includes one month.

3. The media according to claim 1, wherein creating the modified search results page layout further comprises adding one or more additional non-algorithmic search results.

4. The media according to claim 1, wherein the first or second threshold value is based on a geographical location of the user.

5. The media according to claim 1, wherein creating the modified search results page layout further comprises removing one or more additional non-algorithmic search results.

6. One or more computer-storage media having computer-useable instructions stored thereon for performing a method for personalizing a displayed arrangement of search results based on a user's search history, comprising:
   aggregating user search history information associated with a user;
   receiving a search request from the user, the search request comprising a search query associated with a query category;
   deriving an algorithmic search result from a search engine's index;
   retrieving a first non-algorithmic search result corresponding to one of a first non-algorithmic search result type or a second non-algorithmic search result type, wherein search results of both the first and second non-algorithmic search result types are not derived from the search engine's index;
   upon identifying the first non-algorithmic search result as the first non-algorithmic search result type:
   determining a first user access frequency for the first non-algorithmic search result type, wherein determining the first user access frequency includes counting a total number of times that the user accessed search results of the first non-algorithmic search result type within a predetermined period of time, and comparing the first user access frequency to a first threshold value;

upon identifying the first non-algorithmic search result as the second non-algorithmic search result type:

determining a second user access frequency for the second non-algorithmic search result type based on a user satisfaction score that shows a degree of satisfaction that the user had with the second type of non-algorithmic search result, wherein the user satisfaction score is determined using the aggregated information, and comparing the second user access frequency to a second threshold value;

specifying a default search results page layout for a search results page, the search results page including the first non-algorithmic search result and the algorithmic search result, wherein said default layout includes a default arrangement of locations of the algorithmic search result and the first non-algorithmic search result on the search results page;

automatically creating a modified search results page responsive to a determination that the first or second user access frequency is at least as high as the corresponding threshold value, wherein creating the modified search results page is performed by a layout component and includes rearranging the locations of the algorithmic search result and the first non-algorithmic search result on the search results page while retaining the algorithmic search result and the first non-algorithmic search result on the search results page; and providing the modified search results page to the user.

7. The media according to claim 6, wherein the non-algorithmic search result is an instant answer.

8. The media according to claim 6, wherein creating the modified search results page includes removing a second non-algorithmic search result from the search results page, wherein said second non-algorithmic search result is not associated with the query category.

9. The media according to claim 6, wherein determining the user access frequency for the first non-algorithmic search result type includes evaluating at least one item of user search history information to detect how often a user accesses the non-algorithmic result.

10. The media according to claim 6, wherein determining the satisfaction score includes evaluating a plurality of factors associated with the user's interaction with search results during the predetermined period of time.

11. The media according to claim 10, wherein one of the plurality of factors includes an amount of time that the user spent viewing the search results.

12. One or more computer-storage media having computer-useable instructions stored thereon for performing a method for personalizing a displayed arrangement of search results based on a user's search history, comprising:

collecting user search history information associated with a user for a predetermined time period, wherein said user search history information includes information corresponding to user interactions with search results presented to the user, wherein the search results include a plurality of search results of a first non-algorithmic search result type and a second non-algorithmic search result type;

receiving a search request from the user, the search request comprising a search query;

deriving an algorithmic search result from a search engine's index;

retrieving a first non-algorithmic search result corresponding to one of the first non-algorithmic search result type or the second non-algorithmic search result type, wherein said first non-algorithmic search result is not derived from the search engine's index;

upon identifying the first non-algorithmic search result as the first non-algorithmic search result type:

determining a first user access frequency for the first non-algorithmic search result, said determining comprising:

counting a total number of times that the user was presented with search results of the first non-algorithmic search result type within the predetermined period of time, counting a total number of times that the user accessed the first non-algorithmic search result within the predetermined period of time, and determining a percentage corresponding to the number of times the user accessed the first non-algorithmic search result compared to the number of search results of the first non-algorithmic search result type presented to the user during the predetermined period of time, and comparing the first user access frequency to a first threshold value;

upon identifying the first non-algorithmic search result as the second non-algorithmic search result type:

determining a second user access frequency for the second non-algorithmic search result type based on a user satisfaction score that shows a degree of satisfaction that the user had with the second type of non-algorithmic search result, wherein the user satisfaction score is determined using the collected user search history information, and comparing the second user access frequency to a second threshold value;

specifying a search results page layout according to a default arrangement, said specifying comprising specifying a location of the algorithmic search result and a location of the first non-algorithmic search result on a search results page;

automatically creating a modified search results page in response to determining that the first or second user access frequency meets the corresponding threshold value, wherein creating the modified search results page is performed by a layout component and includes rearranging the locations of the algorithmic search result and the first non-algorithmic search result on the search results page while retaining the algorithmic search result and the first non-algorithmic search result on the search results page; and providing the modified search results page to the user.

13. The media according to claim 12, wherein the first non-algorithmic search result is an instant answer.

14. The media according to claim 12, wherein creating the modified search results page includes adding one or more additional non-algorithmic search results.

* * * * *